A. WHITE.
STRUCTURAL SURFACE FOR RECEIVING AND HOLDING PLASTER.
APPLICATION FILED JUNE 12, 1907.
921,767.
Patented May 18, 1909.
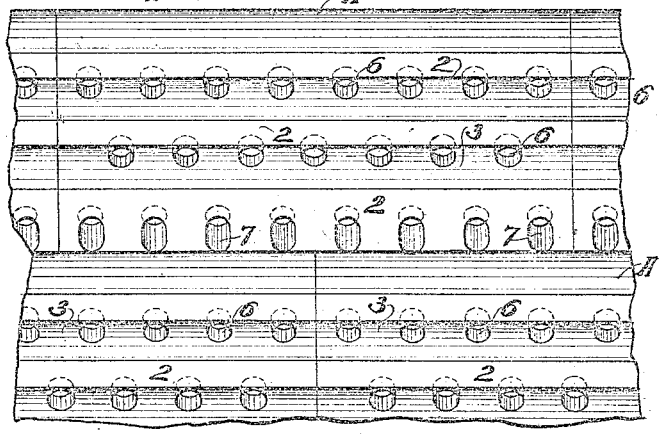
FIG. 1.
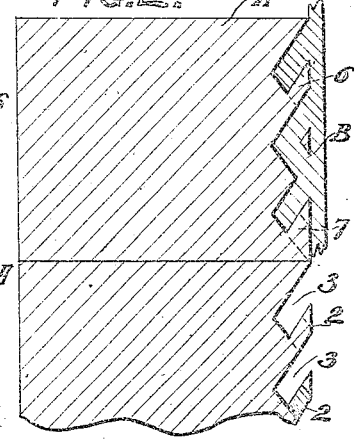
FIG. 2.
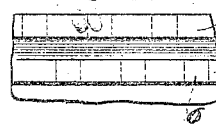 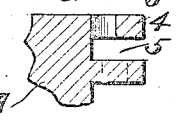 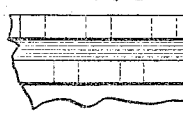 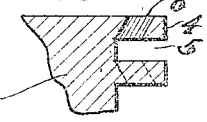
FIG. 3. FIG. 4. FIG. 5. FIG. 6.
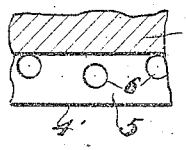 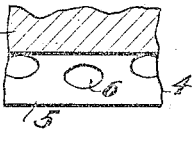 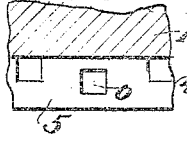 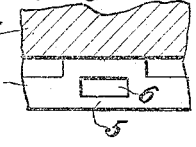 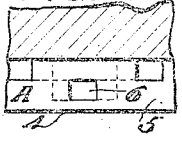
FIG. 7. FIG. 8. FIG. 9. FIG. 10. FIG. 11.
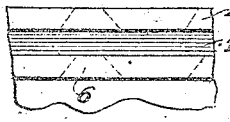 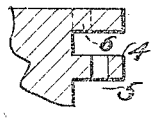 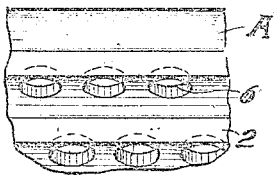 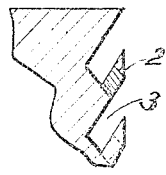
FIG. 12. FIG. 13. FIG. 14. FIG. 15.
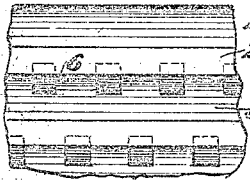 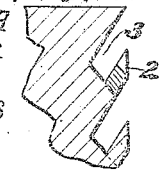 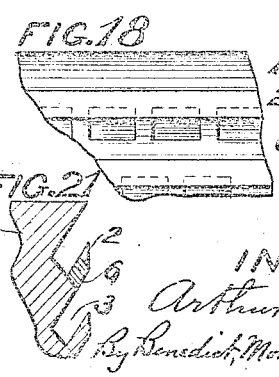 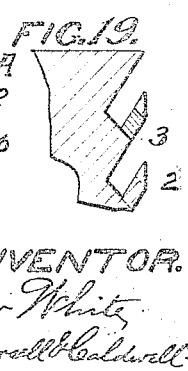
FIG. 16. FIG. 17. FIG. 18. FIG. 19.
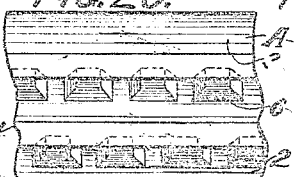 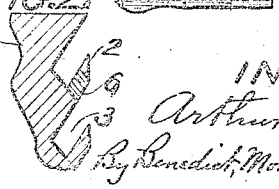
FIG. 20. FIG. 21.
WITNESSES.
L. J. Theuer
Anna F. Schmidtbauer
INVENTOR.
Arthur White
By Benedict, Morsell & Caldwell
ATTORNEYS.

UNITED STATES PATENT OFFICE.

ARTHUR WHITE, OF SHEBOYGAN FALLS, WISCONSIN.

STRUCTURAL SURFACE FOR RECEIVING AND HOLDING PLASTER.

No. 921,767.   Specification of Letters Patent.   Patented May 18, 1909.

Application filed June 12, 1907. Serial No. 378,542.

*To all whom it may concern:*

Be it known that I, ARTHUR WHITE, residing in Sheboygan Falls, in the county of Sheboygan and State of Wisconsin, have invented new and useful Improvements in Structural Surfaces for Receiving and Holding Plaster, of which the following is a description, reference being had to the accompanying drawings, which are a part of this specification.

My invention relates to an improved surface in building blocks, or other structural material, for taking thereon and holding plaster or analogous material.

My improved structural surface is adapted especially for the walls of buildings for taking thereon mortar or plaster in plastic form, in substantially such manner as mortar or plastic plaster, or analogous adhering plastic material, is applied to walls. That the surface is especially adapted for walls, does not detract from its value and adaptation for use in any place or position where plaster or adhering material is employed.

The invention consists of the improved structural surface as herein described and claimed, or the equivalents thereof.

In the drawings, Figure 1 shows a fragment of a wall constructed of building blocks having my improved plaster-holding surface thereon; Fig. 2 is a transverse section of the fragment of a wall, showing also plaster on a portion of the improved surface, thus exhibiting the manner in which mortar is taken and held as plaster on the surface; Fig. 3 is a fragment of a block showing the surface in a different form; Fig. 4 is a transverse section of the form of structure shown in Fig. 3; Figs. 5 and 6 are respectively a side view and a transverse section of another form of surface structure; Figs. 7, 8, 9, 10 and 11 show transverse sections of fragments of building block constructions similar in a general way to those shown in Figs. 3, 4, 5 and 6, but having various forms of apertures in the surface structure that may be employed for receiving mortar and serving to form therein holding or locking portions of the mortar or plastic material; Figs. 12 and 13 are respectively a front view and a transverse section of the structure shown also in Fig. 11; Figs. 14 and 15 show respectively a front or side view and a transverse section of a structural surface having oval apertures; Figs. 16 and 17 show a front view and a transverse section having square apertures; Figs. 18 and 19 show a front view and a transverse section having oblong apertures; and Figs. 20 and 21 show a front view and a transverse section of a structural surface having truncated pyramidal apertures.

My improved structural surface for holding plaster may be in a molded building block or brick or tile, or may be in any other character of building material; that is, it may be in any character of earthen ware, or metal, or wool, or any material capable of being formed into the structural surface character embodying my invention.

While my structural surface may be most conveniently and successfully formed of earthen ware, that is, of a brick, tile, concrete or analogous material, still it may be of any other material capable of being used for such plaster-holding surface.

In the form illustrated in the drawings, there are building blocks A, A, the body or back of which has ribs or tongues 2, with alternating grooves 3 extending across the block preferably longitudinally in the direction that will be horizontal when the blocks are laid up in the wall of the building. These tongues 2 may, as shown in Figs. 1 and 2, project in diagonal or oblique directions from the body of the block, the grooves 3 going obliquely inwardly so as to undercut the tongues, as clearly shown in Fig. 2. Thus when the blocks are in position in a vertical wall the grooves will extend downwardly inwardly, forming suspending and holding hooks for the plaster.

While the diagonal or oblique disposition of the tongues and grooves as shown in several figures is deemed most desirable, yet tongues 4 and grooves 5 disposed at right angles to the body of the structure, as shown in some of the figures, would be quite within the scope of my invention. Through each tongue there is a plurality of apertures 6, always departing from the groove on one side, and usually extending to the groove on the other side of the tongue, though under some conditions these apertures may extend from a groove on one side to the exterior surface of the tongue, as shown at 7. These apertures permit the passage of the mortar through them when, in plastic condition, it is being put on the structural surface, and the mortar passing through the apertures attaches itself and becomes adherent to the mortar on the other side of the tongue, in effect becoming integral therewith, whereby as the mortar sets and becomes hard forming plaster on the structural surface, the plaster by these fingers or tie-bars through the apertures in the tongues is securely and permanently anchored or held in place on the structural surface or wall. The method of the attachment of the plaster to this surface is shown at B in Fig. 2. These finger or tie-bar apertures may be of any selected form, as for illustration round, oval, square, oblong or truncated-pyramidal as shown in the drawings; and with reference to position through the tongue may be at or near its base, or intermediate of the base and the outer edge of the tongue, and may pass through the tongue at right angles to its walls, or oblique thereto, which positions and dispositions of the apertures are shown in the drawings in a few such forms and arrangements, these being quite sufficient to suggest any other similar and equivalent forms for such apertures. Also the apertures may be arranged in alinement longitudinally of the tongues, as in Figs. 1, 14, 16, 18 and 20, or may be in non-alinement as indicated in Figs. 7, 8, 9, 10, 11 and 13. The purpose and method of operation of the apertures, for receiving fingers or tie-bars of mortar and holding the plaster to the structural surface will be substantially the same in all cases.

It should be understood that while my invention of a structural surface is stated herein to be adapted for taking and holding mortar and the plaster that results from the setting or hardening of the mortar, and is called "a plaster-holding surface," it is as well adapted for, and the description is intended to include its use for, taking and holding cement, stucco or any and all other wall-making materials that are applied, while in a plastic condition to a holding surface, and that set or harden into a rigid and permanent outer coat of the wall.

What I claim as my invention is:

1. In combination with a building block adapted to be built with duplicate blocks into and form a wall of a building, a structural surface for receiving and holding surface-forming material comprising projections in a series of parallel and adjacent lines on and across the face of the block and integral therewith, the projections being provided with apertures through them laterally adapted to permit of the passage of soft plastic surface-forming material through them and allowing the portion thereof coming from opposite sides of the projections to intermingle and adhere forming when the material has set integral rigid interlocking bars of the surface-forming material through the apertures and clasping the projections.

2. In combination with a building block adapted to be built with duplicate blocks into and form a wall of a building, a structural surface for receiving and holding surface-forming material, comprising projections in a series of adjacent lines on and across the face of the block and integral therewith, the projections being provided with apertures through them laterally adapted to permit of the passage of soft, plastic surface-forming material through them and allowing the portions thereof coming from opposite sides of the projections to intermingle and adhere forming when the material has set integral rigid interlocking bars of the surface-forming material through the apertures and clasping the projections.

3. In combination with a building block adapted to be built with duplicate blocks into and form a wall of a building, a structural surface for receiving and holding surface-forming material, comprising oblique projections in a series of adjacent lines on and across the face of the block and integral therewith, the projections being provided with apertures through them laterally adapted to permit of the passage of soft plastic surface-forming material through them and allowing the portions thereof coming from opposite sides of the projections to intermingle and adhere forming when the material has set integral rigid interlocking bars of the surface-forming material through the apertures and clasping the projections.

4. A wall constructed of building blocks each block having a series of adjacent surface-holding projections on and across the face thereof the projections having apertures laterally through them, and a surfacing material originally applied to the faces of the blocks in plastic condition covering the surface thereof and entering between and clasping the projections and passing entirely through and adhering together in the apertures in each projection severally forming when set rigid integral bars of the surface-forming material integral with the material between the projections on the blocks and bearing against and clasping the projections on and along the walls of the apertures and through the apertures.

In testimony whereof, I affix my signature, in presence of two witnesses.

ARTHUR WHITE.

Witnesses:
ANNA F. SCHMIDTBAUER,
C. T. BENEDICT.